(12) United States Patent
Pfeiffer et al.

(10) Patent No.: US 6,427,318 B1
(45) Date of Patent: Aug. 6, 2002

(54) UNIVERSAL SMART MERGE/DEMERGE TOOL

(75) Inventors: Michael W. Pfeiffer, Richfield; Eric D. Johnson, Minneapolis; Donald L. Compton, Eagan, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/409,758

(22) Filed: Sep. 30, 1999

Related U.S. Application Data

(60) Provisional application No. 60/132,996, filed on May 7, 1999.

(51) Int. Cl.[7] ................................................ G11B 5/42
(52) U.S. Cl. ................... 29/603.03; 29/737; 29/759; 29/760; 29/762; 29/770
(58) Field of Search ........................ 29/603.03, 737, 29/759, 760, DIG. 28, 402.08, 762, 770; 369/36, 38; 360/98.07, 98.08, 99.08

(56) References Cited

U.S. PATENT DOCUMENTS

| | | | | |
|---|---|---|---|---|
| 4,502,133 A | * | 2/1985 | Siryj et al. | 369/34 |
| 4,862,584 A | * | 9/1989 | Budy et al. | 29/704 |
| 4,980,783 A | * | 12/1990 | Moir et al. | 360/77.02 |
| 5,150,512 A | * | 9/1992 | Hatchett et al. | 29/603 |
| RE36,608 E | * | 3/2000 | Smith et al. | 33/617 |
| 6,041,488 A | * | 3/2000 | Wang | 29/603.03 |
| 6,049,969 A | * | 4/2000 | Jenkins et al. | 29/737 |
| 6,105,240 A | * | 8/2000 | Chuang et al. | 29/729 |

\* cited by examiner

*Primary Examiner*—Carl J. Arbes
*Assistant Examiner*—Minh Trinh
(74) *Attorney, Agent, or Firm*—Westman, Champlin & Kelly, P.A.

(57) ABSTRACT

An apparatus for assembling a disc storage system includes a base having a number of subassemblies. A disc pack subassembly is mounted on the base and is configured to support a disc pack and an actuator subassembly is mounted on the base and is configured to support an actuator assembly. A drive mechanism merges the disc pack subassembly together with the actuator subassembly whereby transducer heads in the actuator subassembly are positioned on disc surfaces of the disc pack. At least one of the subassemblies is releasably mounted to the base and the subassembly can be replaced for assembly differing disc storage systems or upon failure of the subassembly.

18 Claims, 4 Drawing Sheets

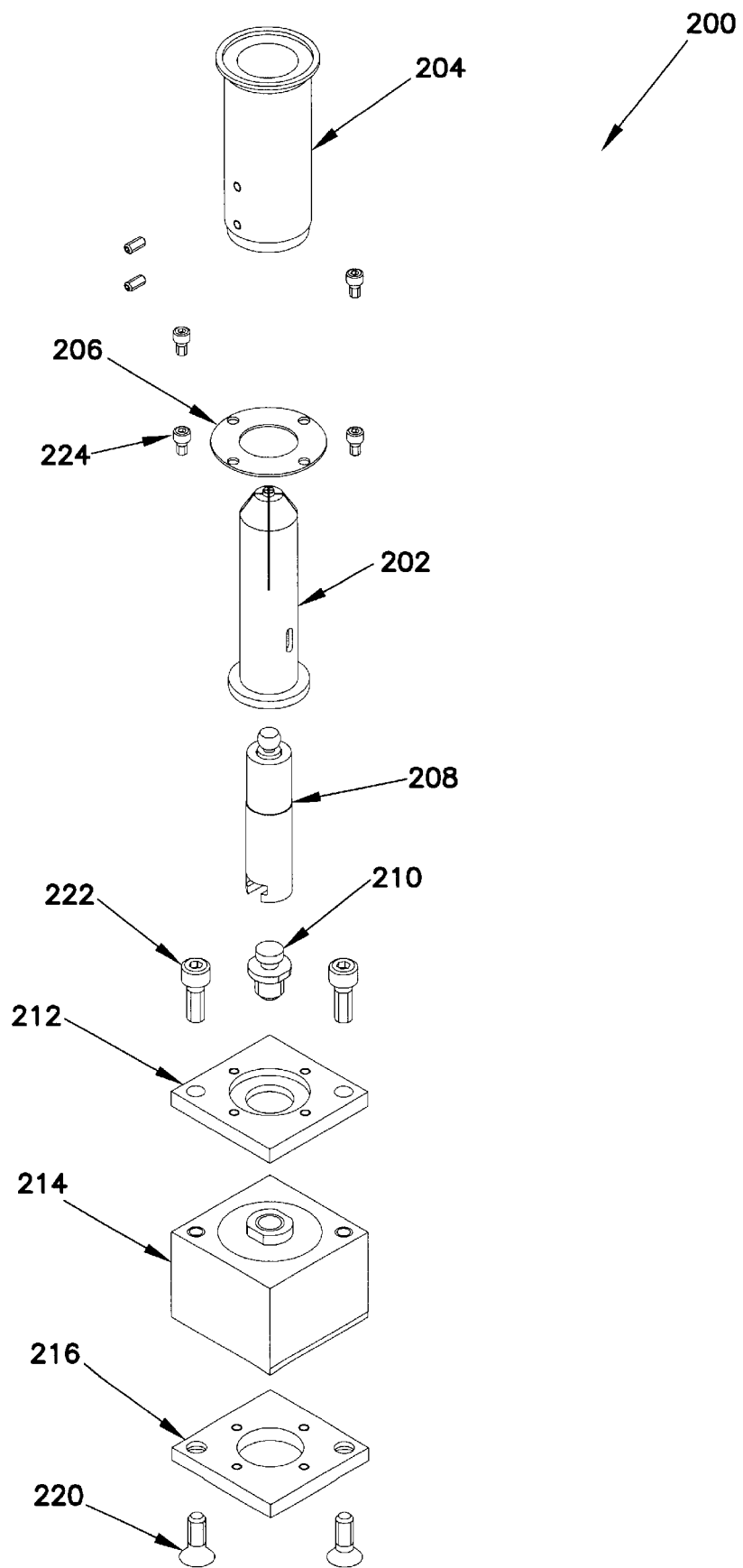

UNIVERSAL SMART MERGE/DEMERGE TOOL

CROSS-REFERENCE TO CO-PENDING APPLICATION

This application claims priority benefits from U.S. provisional patent application Serial No. 60/132,996, filed May 7, 1999 and entitled "UNIVERSAL SMART MERGE/DEMERGE TOOL."

FIELD OF THE INVENTION

The present invention relates to disc drive storage systems. More specifically, the present invention relates to the assembly (or disassembly) of disc drive storage systems.

BACKGROUND OF THE INVENTION

Disc storage systems are used for digitally storing information. Typical disc storage systems include a number of discs all arranged on a single hub (known as a disc pack) and a number of transducers which is associated with each of the disc surfaces. The transducers are carried on armatures which move about a central pivot axis. This arrangement is referred to as an actuator assembly or "E-block".

Modern disc storage systems operate at extremely high density and use relatively delicate components. The process of positioning the actuator assembly next to the disc pack such that the transducers are aligned on the disc surfaces is a very delicate, precise manufacturing step. In order to facilitate production line assembly of disc storage systems, assembly tools known as "merge" tool and disassembly devices as "demerge" tools have been developed. For example, U.S. Pat. No. 4,862,584 entitled "DISK DRIVE ASSEMBLY STATION" which issued on Aug. 1, 1988 to Rigidyne Corporation describes a merge tool in which the disc pack is moved into a position adjacent the actuator assembly to position the transducing heads over the disc surfaces. A housing cover can then be positioned over the disc pack and actuator assembly securing the components in place. Another example merging technique is described in U.S. Pat. No. 5,150,512 entitled "METHOD OF ASSEMBLING A DISK FILE" which issued Sep. 29, 1992 to IBM Corporation. The demerge tool operates in reverse and allows for the controlled disassembly of the disk storage system. The demerge operation is also quite delicate and the disc storage system components can be easily damaged. Some tools function as both merge and demerge tools.

Typical merge and demerge tools have been customized for specific types of disc storage systems. As new disc drive storage systems are developed, new tools must also be developed. Furthermore, if an assembly line changes from assembling one disc storage system model to another disc storage system model, the merge tool must be replaced with a new merge tool configured for the new storage system.

The present invention provides a solution to this and other problems and offers other advantages over the prior art.

SUMMARY OF THE INVENTION

The present invention relates to merge and demerge tools which include removable subassemblies and which solve the above-mentioned problem.

In accordance with one embodiment, an apparatus for assembling or disabling a disc storage system includes a base, a disc pack subassembly mounted on the base configured to support a disc pack, an actuator subassembly mounted on the base configured to support an actuator assembly, and a drive mechanism mounted on the base configured to merge the disc pack subassembly together with the actuator subassembly. At least one of the subassemblies is releasably mounted to the base whereby the subassembly can be replaced for assembly differing disc storage systems.

BRIEF DESCRIPTION OF THE DRAWINGS

FIG. 4 is an exploded view of a collet assembly in accordance with one aspect of the present invention.

DETAILED DESCRIPTION

Figure 1:
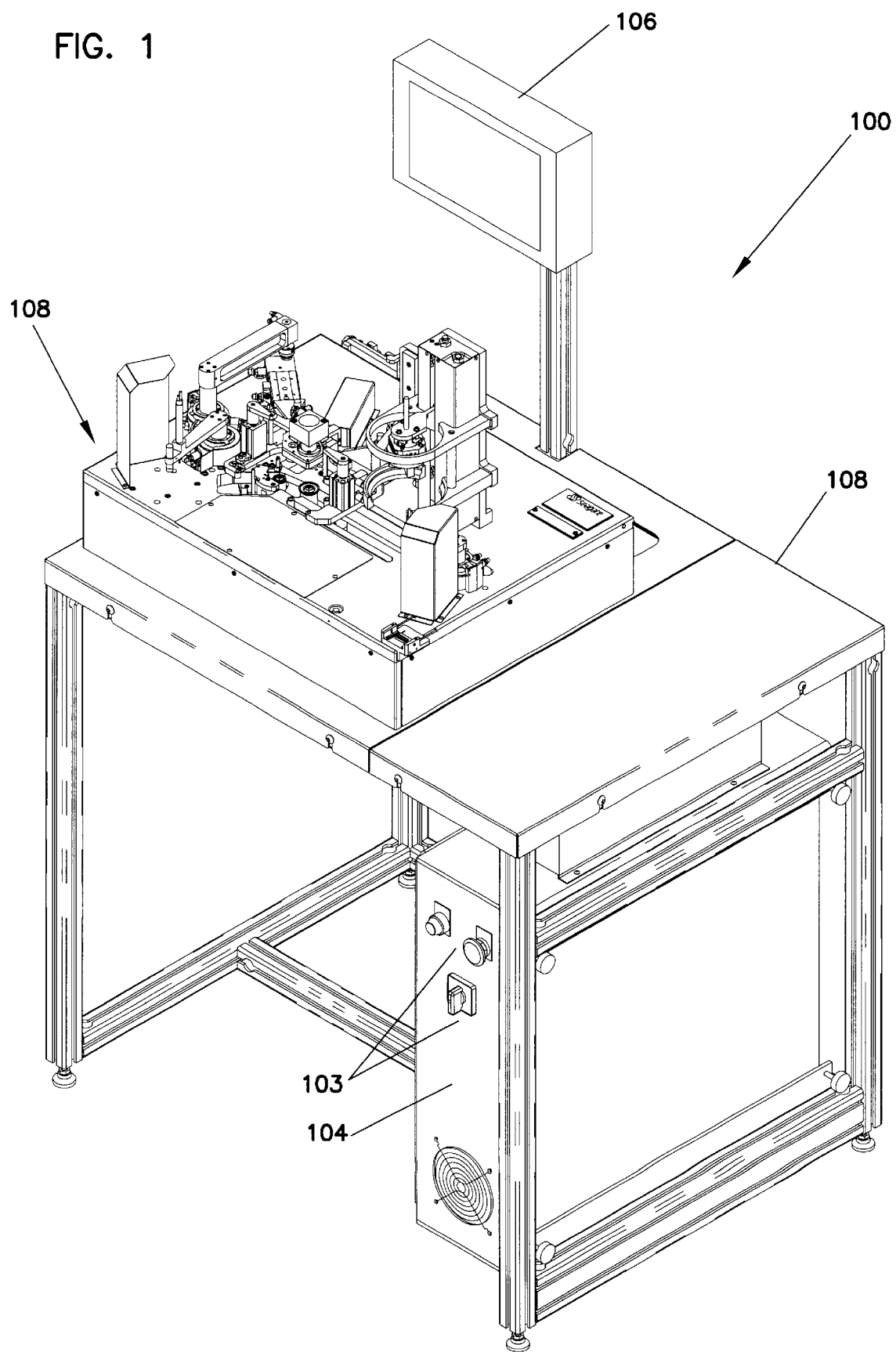
FIG. 1 is a perspective view of a merge/demerge tool.

Referring now to FIG. 1, a merge/demerge tool 100 is in accordance with one example embodiment illustrated. A merge/demerge tool such as tool 100 includes a base 102, a controller 104, a display 106 and an assembly mechanism 108. Typically, tool 100 is used on an assembly line for assembling (or disassembling) disc storage systems. As described herein, an operator operates tool 100 by actuating user inputs 103 on controller 104 which controls the assembly. Controller 104 provides diagnostics, instructions or other information to the operator using display 106.

Typical prior art merge tools could be used with only a single type of disc storage system. If another model disc storage system was to be assembled, a new tool needed to be developed. Further, if any of the components failed in the assembly tool, replacement of the component was often difficult and time consuming resulting in extended down times of the assembly line. The merge/demerge tool of the present invention includes subassemblies which can be easily replaced. A registration mechanism, such as registration pins, is used to align the subassemblies with the base and facilitate subassembly replacement. This allows failed subassemblies to be quickly replaced. Further, the merge/demerge tool can be quickly modified to operate with other models or configurations of disc storage systems by replacement of the appropriate subassemblies.

Figure 2:
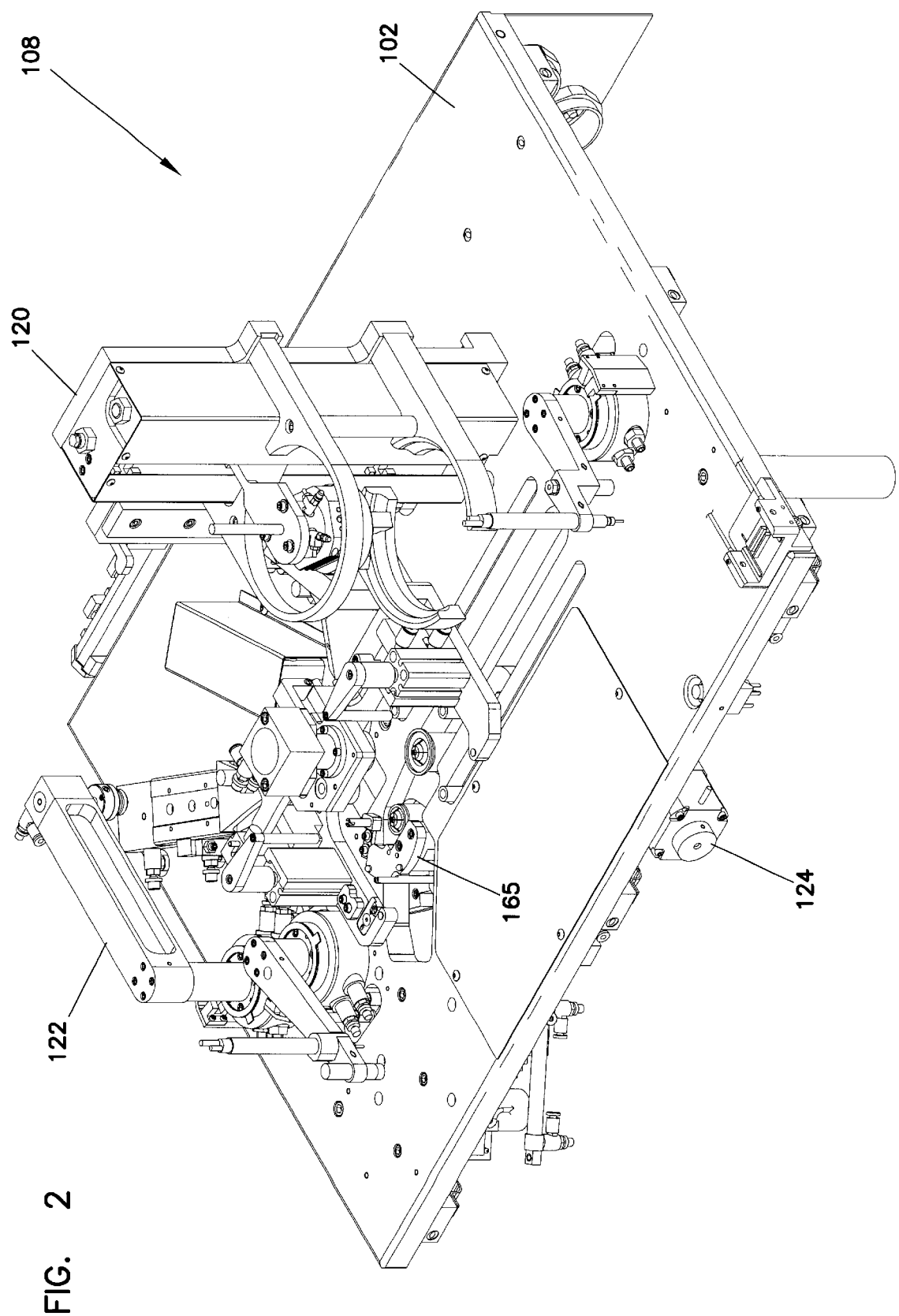
FIG. 2 is a perspective view of a assembly mechanism of the merge tool of FIG. 1.
Figure 3:
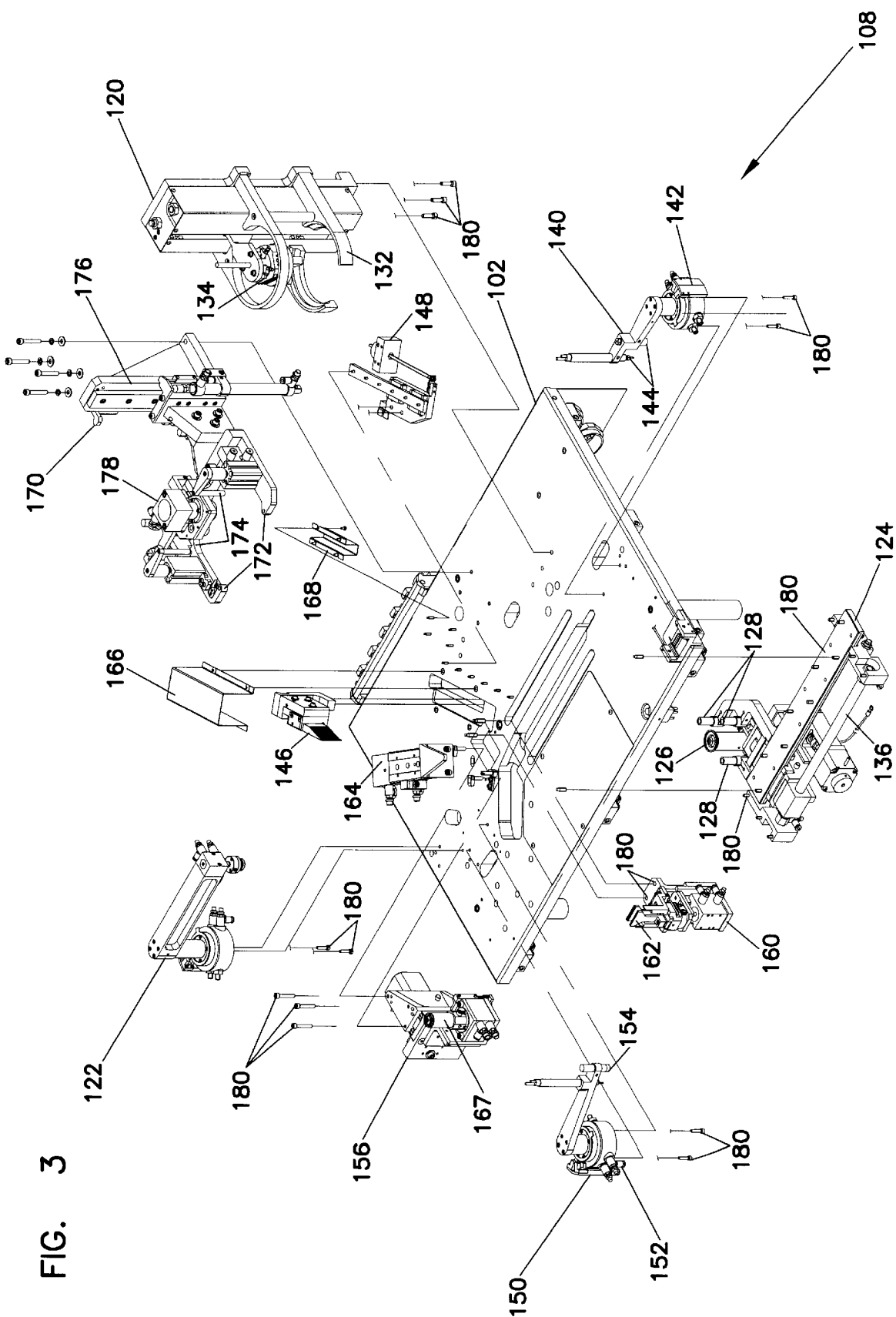
FIG. 3 is an exploded perspective view of the assembly mechanism of FIG. 2.

FIG. 2 is a perspective view and FIG. 3 is an exploded view of assembly mechanism 108 more clearly illustrating one embodiment of the present invention. Assembly mechanism 108 includes a number of sensors which provide data to controller 104 such that controller 104 can then actuate actuators to thereby control the assembly process. Referring to FIG. 2, a disc pack loader 120 is positioned on one side of the base 102 to hold a disc pack and an actuator clamp assembly 122 is positioned on the other side of base 102 to hold an actuator assembly. A pack slide assembly 124 shown in FIG. 3 is actuated by controller 104 in FIG. 1 and moves the disc pack from the pack loader 120 in a direction toward the actuator assembly held in the actuator clamp assembly 122. The disc pack is supported on collet 126 and its vertical position is sensed using sensors 128. Controller 104 adjusts the vertical position of the disc pack so that it is aligned with the actuator assembly by sensing its position with sensors 128.

Pack loader assembly 120 includes arms 132 and gripper 134. Gripper 134 grips and removes a container which carries the disc pack assembly. Collet 126 of pack slide assembly 124 moves along rod 136 to move the disc pack toward the actuator assembly. A pack sensor assembly 140 pivots about cylinder 142 and is used to sense the position of the disc pack using sensors 144. A head spreader assembly 146 includes a comb-like structure which is used to separate the individual transducing armatures and heads in the actuator assembly. Head comb assembly 146 moves into position through the actuation of head spreader assembly actuator 148.

An actuator sensor assembly 150 moves about cylinder 152 and senses the position of the actuator assembly using sensors 154. A cartridge clamp assembly 156 mounts to the underside of base 102 and is used to vertically position the actuator assembly. The connector plugger assembly 160 includes a gripper 162 which is used to grasp and insert a plug into the actuator assembly. A clamp 164 is moved into position to cover the actuator assembly such that plugger assembly 160 can provide an upward force to the actuator assembly. Covers 166 and 168 cover portions of the system. A magnet clamp assembly 165 (shown in FIG. 2) is used to mount a voice coil magnet onto the actuator assembly. The actuator assembly is carried on collet 167.

A deck loader assembly 170 is used to carry a cover or a "deck" which covers the actuator assembly and the disc pack. Deck loader assembly 170 includes deck supports 172 and position sensors 174. The deck load assembly moves the deck in a vertical direction along vertical actuator 176. A motor and gear box assembly 178 is used to drive a spanner nut of the disc pack which attaches the deck to a spindle motor of the disc pack.

As illustrated in FIG. 3, the various subassemblies of assembly mechanism 108 include registration pins 180 which are used to register the subassemblies in position on base 102 in appropriate registration holes. If a subassembly fails during manufacture, an operator or technician merely needs to remove the malfunctioning subassembly and replace it with a new, functioning subassembly. Registration is quickly achieved through the use of the registration pins 180. Additionally, a calibrator piece can be used which emulates the dimensions of the various disc components. This calibration is used for any fine adjustments of the placements of the subassemblies.

Additionally, if the assembly mechanism 108 needs to be used for assembling a new or different type of disc drive system, it is relatively easy to replace those subassemblies as needed for the new disc storage system. This retooling operation can be done while the system is on the assembly line and does not require replacement of the entire assembly system.

Operation of assembly mechanism 108 is controlled through controller 104. An operator initiates the assembly process using inputs 103. A disc pack is positioned in pack loader assembly 120 and an actuator assembly is positioned in actuator clamp assembly 122. A deck is positioned in deck loader assembly 170 and supported by deck supports 172. Controller 104 spreads the individual armatures of the actuator assembly using head spreader assembly 146 which is moved by head spreader actuator assembly 148 into position. The disc pack is then moved towards the actuator assembly using pack slide assembly 124. Vertical and horizontal alignment can also be controlled by the controller and sensed using various sensors. The deck is then lowered into position using deck loader assembly 170 and the disc storage system is then secured together by attaching a spanner nut of the disc pack using gear box assembly 178. A demerge operation proceeds in the reverse order and the disc pack is separated from the actuator assembly.

With the present invention the merge/demerge tool 100 can typically be converted from assembling one type of disc drive to assembling another type of disc drive in less than one hour and in a substantial cost saving. A single merge/demerge tool can be used to assembly multiple different types of disc drives thereby reducing the overall total number of merge/demerge tools which are required. The controller 104 is capable of coupling to a network for receiving commands, reporting information and for sensor calibration. Errors are reported on display 106 such that an operator can correct the error and recover from the problem.

FIG. 4 is an exploded view illustrating a replaceable collet assembly 200 in accordance with the present invention. Collet assembly 200 can be used in the various subassemblies, such as pack slide assembly 124 shown in FIGS. 2 and 3. Collet assembly 200 includes collect 202, datum ring 204, retainer ring 206, collet expander 208, coupling 210, nest 212, air cylinder 214 and base 216. As illustrated in FIG. 4, air cylinder 214 mounts to base 216 using screws 220. Collet 202 is located within datum ring 204 and rests upon collet expander 208 and coupling 210. Nest 212 is secured to air cylinder 214 using screws 222. Collet 202 is secured to nest 212 by retainer ring 206 which is held in place by screws 224. Collet assembly 200 typically experiences relatively high forces during the merge or demerge process. The various components of collet assembly 200 frequently break, wear or otherwise need periodic replacement. The collet assembly 200 of the present invention includes component that are easily replaced. For example, if collet 202 should be damaged, an operator can easily replace collet 202 by removing screws 224 and retainer ring 206 such that collet 202 can be removed. A new collet 202 can then be easily reassembled into collet assembly 200. This configuration also reduces the down time of the assembly line should the collet fail and reduces maintenance times or inspection times.

Various aspects of the present invention include an apparatus 100 for assembling or disassembling a disc storage system. The apparatus 100 includes a base 102, a disc pack loader subassembly 120 mounted on the base configured to support a disc pack and an actuator subassembly 122 mounted on the base 102 configured to support an actuator assembly. A drive mechanism such as pack slide assembly 124 is configured to move the disc pack relative to the actuator subassembly. At least one of the subassemblies is releasably mounted to the base 102 such that the subassembly can be replaced for use with differing types of disc storage systems or if the subassembly fails. A registration mechanism such as registration pins 180 are configured to secure the subassemblies relative to the base and register the subassemblies. In various embodiments, any number of subassemblies can be releasably mounted. Another replaceable subassembly includes a deck loader subassembly 170 which can be configured to attach a spanner nut of the disc pack to a deck which is driven by a gear box 178. Other subassemblies include position sensors such as sensors 140 and 150 which sense the position of components of the disc storage system. A replaceable head spreader subassembly 146 can also be provided which is driven by a replaceable head spreader assembly actuator 148. A replaceable plugger assembly 160 can also be provided. The apparatus 100 can be configured as a merge tool, a demerge tool or a combination merge/demerge tool. In another aspect of the invention, at least one replaceable collet assembly 200 is provided in which a collet 202 is secured by a removable retainer ring 206. The removable retainer ring 206 is secured using screws 224. The tool 100 can also include a display 106 and an input 103 for use by an operator. The controller 104 can be configured to couple to a computer network.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the merge/demerge tool while maintaining substantially the same functionality without departing from the scope and spirit of the present invention. In addition, although the preferred embodiment described herein is directed to a merge/demerge tool for a specific disc storage system, it will be appreciated by those skilled in the art that the teachings of the present invention can be applied to other types or configurations of disc storage systems, without departing from the scope and spirit of the present invention. The invention is applicable to merge tools, demerge tools, and combination merge/demerge tools. The registration mechanism can be any type of system which can be used to align the subassemblies. Pins are simply a preferred embodiment. Other registration mechanisms include screws, grooves, indentations, and markings, for example.

What is claimed is:

1. An apparatus for assembling or disassembling a disc storage system, comprising:
    a base;
    a disc pack loader subassembly mounted on the base configured to support a disc pack;
    an actuator subassembly mounted on the base configured to support an actuator assembly wherein at least one of the subassemblies is releasably mounted to the base whereby the subassembly can be replaced for use with differing types of disc storage systems; and
    a drive mechanism mounted on the base configured to move the disc pack relative to the actuator subassembly whereby transducer heads in the actuator assembly are positioned proximate disc surfaces of the disc pack.

2. The apparatus of claim 1 including a registration mechanism configured to register the at least one subassembly relative to the base.

3. The apparatus of claim 2 wherein the registration mechanism comprises at least two registration pins configured to secure the at least one subassembly relative to the base.

4. The apparatus of claim 1 wherein both of the subassemblies are releasably mounted to base whereby both subassemblies can be replaced for assembling disc storage systems.

5. The apparatus of claim 1 including a replaceable deck loader subassembly configured to mount a deck on the disc pack and the actuator assembly.

6. The apparatus of claim 5 wherein the deck loader subassembly is configured to attach a spanner nut of the disc pack to the deck.

7. The apparatus of claim 6 wherein the deck loader subassembly includes a gear box configured to attach the spanner nut.

8. The apparatus of claim 1 including a replaceable position sensor subassembly configured to sense position of components of the disc storage system.

9. The apparatus of claim 1 including a replaceable head spreader subassembly configured to spread heads of the actuator assembly.

10. The apparatus of claim 9 wherein a replaceable actuator subassembly coupled to the head spreader subassembly.

11. The apparatus of claim 1 including a replaceable plugger subassembly.

12. The apparatus of claim 1 wherein the apparatus is configured as a merge/demerge tool.

13. The apparatus of claim 1 including at least one replaceable collet assembly.

14. The apparatus of claim 13 wherein the replaceable collet assembly includes a collet secured by removable retainer ring.

15. The apparatus of claim 14 wherein the removable retainer ring is secured to the replaceable collet assembly by screws.

16. The apparatus of claim 1 including a display and a user input.

17. The apparatus of claim 1 including a controller configured to couple to a network.

18. An apparatus for assembling or disassembling a disc storage system, comprising:
    at least one subassembly means for assembling the disc storage system; and
    a releasable registration means for releasably mounting the at least one of the subassemblies to a base.

* * * * *

UNITED STATES PATENT AND TRADEMARK OFFICE
CERTIFICATE OF CORRECTION

PATENT NO. : 6,427,318 B1
DATED : August 6, 2002
INVENTOR(S) : Michael W. Pfeiffe et al.

It is certified that error appears in the above-identified patent and that said Letters Patent is hereby corrected as shown below:

<u>Title page,</u>
Item [56], References Cited, U.S. PATENT DOCUMENTS, add the following:

| | | | |
|---|---|---|---|
| -- 3,984,873 | 10/1976 | Pejcha | 360/105 |
| 4,005,485 | 1/1977 | Opocensky | 360/75 |
| 4,851,943 | 7/1989 | Perry | 360/105 |
| 5,012,570 | 5/1991 | Hoskins et al. | 29/467 |
| 5,265,325 | 11/1993 | Fortin | 29/742 |
| 5,465,467 | 11/1995 | Krajec et al. | 29/759 |
| 5,471,733 | 12/1995 | Bernett et al. | 29/603 |
| 5,692,289 | 12/1997 | Amada et al. | 29/603.03 |
| 5,826,325 | 10/1998 | Price et al. | 29/603.03 -- |

Signed and Sealed this

Eighth Day of April, 2003

JAMES E. ROGAN
*Director of the United States Patent and Trademark Office*